United States Patent [19]

Coddington

[11] 4,011,848

[45] Mar. 15, 1977

[54] FUEL FILTER AND ROLL-OVER VALVE

[75] Inventor: Thomas Tucker Coddington, Troy, Mich.

[73] Assignee: Chrysler Corporation, Highland Park, Mich.

[22] Filed: Aug. 15, 1975

[21] Appl. No.: 605,098

[52] U.S. Cl. ........................ 123/136; 123/198 DB; 137/469; 180/104

[51] Int. Cl.$^2$ .................. F02M 59/46; F16K 17/36; B60K 28/00

[58] Field of Search .................... 123/136, 198 DB; 137/469; 180/104

[56] References Cited

UNITED STATES PATENTS

| | | | |
|---|---|---|---|
| 151,027 | 5/1874 | Hodgins | 137/469 |
| 2,727,529 | 12/1955 | Kodet | 137/469 |
| 2,817,356 | 12/1957 | Glass et al. | 137/469 |
| 3,368,538 | 2/1968 | Pauli et al. | 123/136 |
| 3,417,768 | 12/1968 | Wasson | 137/469 X |
| 3,730,159 | 5/1973 | Sallot | 123/136 |
| 3,910,301 | 10/1975 | Kuss | 180/104 X |

FOREIGN PATENTS OR APPLICATIONS

| | | | |
|---|---|---|---|
| 121,570 | 12/1918 | United Kingdom | 137/469 |

*Primary Examiner*—C. J. Husar
*Assistant Examiner*—Tony M. Argenbright
*Attorney, Agent, or Firm*—Talburtt & Baldwin

[57] ABSTRACT

A fuel supply line for an automobile engine extends from a fuel tank to a carburetor and contains an engine driven fuel pump and a poppet type flow check or roll-over valve downstream of the pump, which valve is normally held open by comparatively low pump pressure. If the engine stalls, as for example in the event of a collision or automobile roll-over, the pump will stop operating and the valve will be positively closed by a spring to prevent fuel leaking from the tank. The valve will not re-open until subjected to comparatively high pump pressure upon restarting of the engine.

7 Claims, 3 Drawing Figures

FUEL FILTER AND ROLL-OVER VALVE

BACKGROUND AND OBJECTS OF THE INVENTION

This invention relates to a fuel filter, fuel vapor separator, and flow check or roll-over valve in the fuel supply line between the carburetor and an engine driven fuel pump for an automobile engine and has for a specific object the provision of improved flow check means in the fuel supply line to prevent fuel leakage from the fuel tank in the event of an accident, as for example where the automobile is rolled over or tilted to such an angle that fuel would otherwise flow by gravity through the fuel line from the tank.

Invariably in consequence of such an accident, the engine stalls. Another object therefore is to provide a flow check or roll-over valve as above comprising a poppet type valve which is normally closed to prevent fuel leakage from the fuel tank when the engine is not operating, but which opens when subjected to comparatively high output pressure from the fuel pump when the engine is operating, and which thereafter remains open in response to comparatively low fuel pump pressure. Accordingly as soon as the valve opens, the pump operates normally and efficiently against comparatively small back pressure, conserving power, and minimizing wear and the necessity for costly high pressure components. Also minimized is the possibility of vapor lock and consequent inefficient pump operation which might otherwise occur during hot operating conditions if the pump were required to pump against a greater output pressure.

The fuel supply line is ordinarily subject to heat from the road and the engine exhaust system. Vapor formation which interfers with proper operation of the fuel pump and fuel metering at the carburetor tends to increase as the liquid fuel flows from the tank to the carburetor. Where fuel vapor formation is a problem, it is customary to separate the vapor from the fuel supply line adjacent and upstream of the carburetor to enhance fuel metering and also to return the vapor and excess fuel discharged from the fuel pump to the fuel tank via a restricted return line, thereby to minimize vapor formation and vapor lock in the pump by assuring a continuous flow of comparatively fresh cool low pressure liquid fuel through the pump.

Another object of the invention is to provide a roll-over valve of the above character which is cooperable with a vapor separator and a low resistance fuel filter combination comprising a restricted vapor return line to the fuel tank connected with the fuel supply line at a location between the fuel pump and both the filter and roll-over valve, whereby fuel vapor if any is returned to the fuel tank along with a portion of the liquid fuel output from the pump. Any vapor that does form in the pump is discharged along with liquid fuel by virtue of the low back pressure on the pump effected by the comparatively low resistance of the filter and roll-over valve and the restriction in the vapor return line, which restriction is predetermined to force fuel through the filter and roll-over valve to the carburetor.

Another object is to provide the combination of elements as aforesaid wherein many of the components may be readily manufactured economically within the required production tolerances from sheet metal stampings, and wherein the filter is located upstream of the check valve to protect the latter's closely interfitting parts from solid particulates or other dirt in the fuel and interfering with closing of the valve when the pump is not operating, thereby to assure positive and reliable operation of the valve in preventing fuel leakage in the event of a vehicle roll-over.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

BRIEF DESCRIPTION OF THE PREFERRED EMBODIMENT

Figure 1:
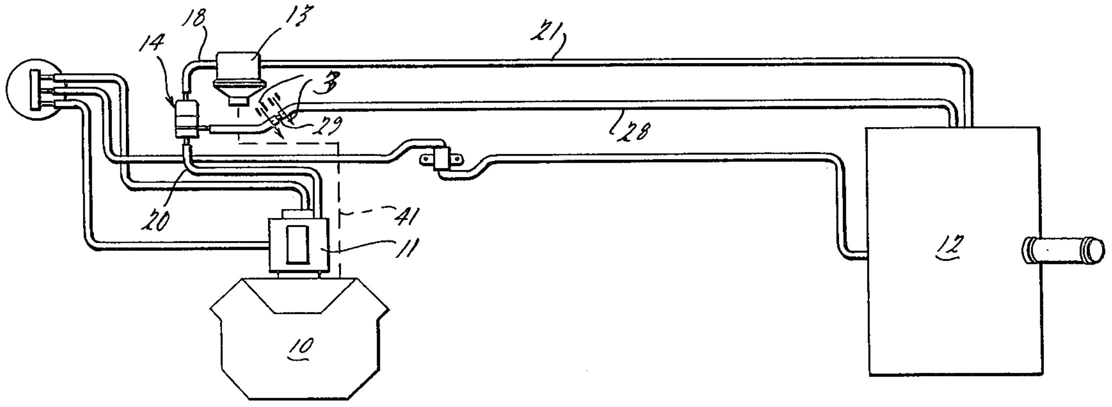
FIG. 1 is a schematic circuit diagram of an automobile fuel supply system.
Figure 2:
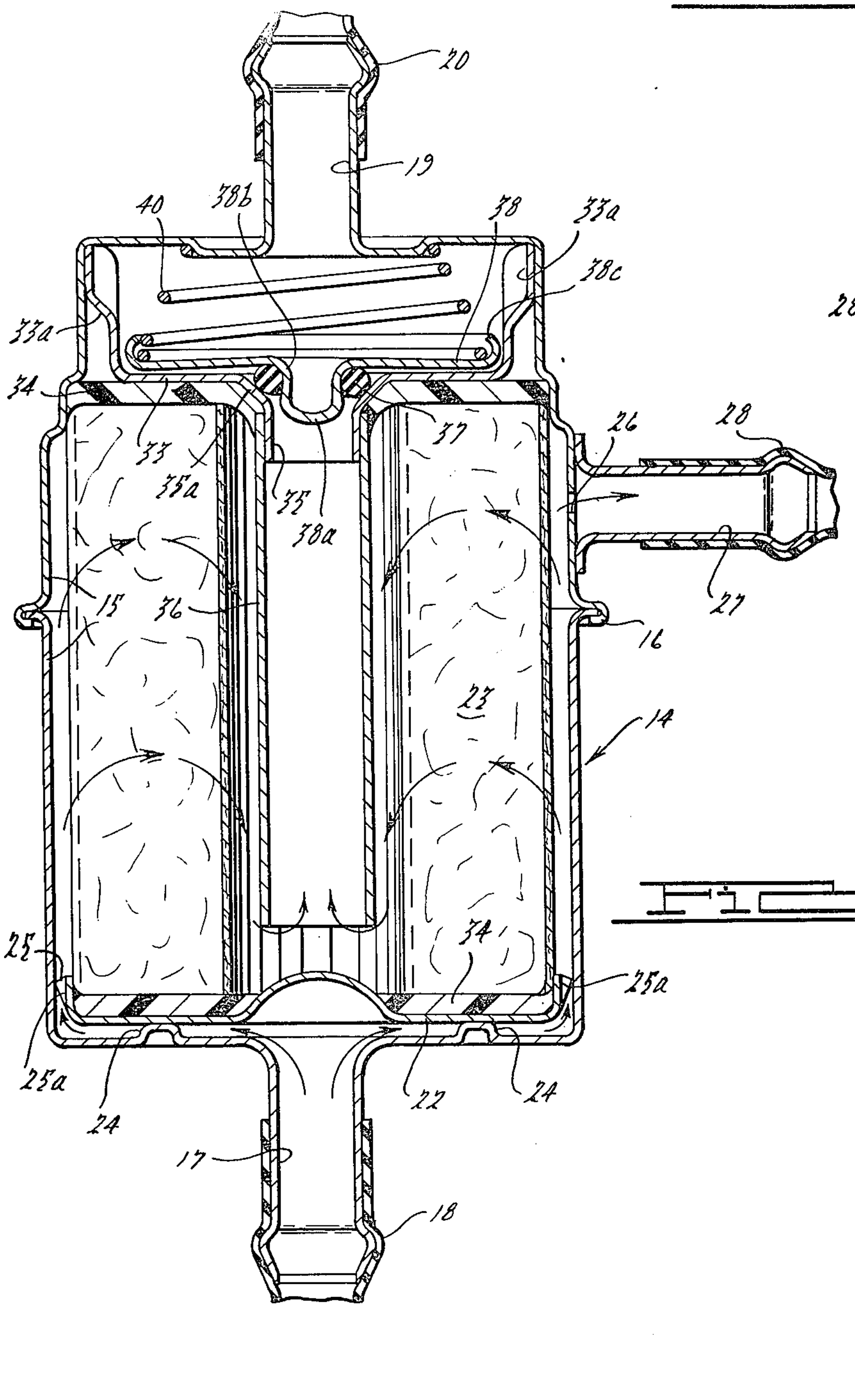
FIG. 2 is an enlarged axial mid-sectional view through the fuel filter, vapor separator and flow check valve illustrated in FIG. 1.

Referring to the drawings, an automobile engine 10 is illustrated wherein fuel is pumped to a carburetor 11 from a fuel tank 12 by means of an engine driven fuel pump 13 through an emergency flow check device 14. The latter as illustrated in FIG. 2 comprises a cylindrical two piece housing 15 defined by confronting upper and lower cup-like portions joined in a conventional manner at a fluid type seal 16. The housing 15 has a lower coaxial inlet 17 connected to the pump 13 via a conduit 18, and has a coaxial outlet 19 connected to the carburetor 11 via a conduit 20. The pump 13 is connected with the tank 12 by a supply conduit 21.

Within a housing 15, a circular filter supporting plate 22 supports an annular coaxial filter 23. The plate 22 is supported in turn on a plurality of circumferentially spaced dimples 24 projecting inwardly from the base of the lower housing cup 15. The periphery of the plate 22 comprises an annular upturned rim 25 engaging the inner cylindrical wall of the housing 15 so as to be positively located therein and is indented at a plurality of circumferentially spaced location **25*a* to provide passages for fuel. Accordingly, fuel entering the lower inlet 17 from the pump 13 will fan out radially in the space between the plate 22 and housing 15, around the dimples 24, and then upwardly between the housing 15 and the outer periphery of the filter 23 via the passages effected by the indentations 25*a*.**

Figure 3:
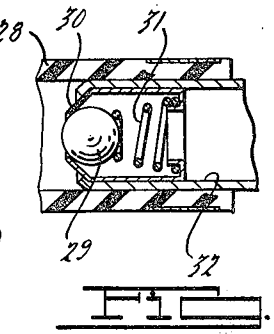
FIG. 3 is an enlarged axial mid-sectional view through the one-way valve in the vapor return line.

An upper portion of the cylindrical wall of the housing 15 is provided with a restricted opening 26 in communication with an outlet nipple 27 connected by means of a vapor return line 28 to the fuel tank 12. A one-way ball check valve in the line 28 between the restriction 26 and tank 12 comprises a ball 29, FIG. 3, normally held seated at an annular valve seat 30 by means of a light spring 31 confined within a tubular insert 32 that supports the valve seat 30 at its left end, FIG. 3. The restricted port 26 allows fuel vapor and excess liquid fuel to return from the housing 15 to the fuel tank 12 and in conjunction with the ball check 29 effects sufficient pressure to cause fuel flow radially inward through the body of the low resistance annular filter 23 as indicated by the fuel flow arrows.

An upper orifice plate 33 overlies the upper end of the filter 23 and like the bottom supporting plate 22, is secured to and spaced from the adjacent axial end of the filter 23 by a plastic sealer 34 to prevent axial flow of fuel to and from the filter 23. The plate 33 has a central orifice or port 35 defined by a deformed tubular portion having a pressed fit within a tubular spout 36 arranged coaxially within the annular filter 23 and spaced radially from its inner circumference. This fuel flowing radially inward through the filter 23 is forced axially downward in the space between the inner circumference of the filter 23 and the tubular spout 36 to adjacent the lower end of the housing 15 in FIG, 2. The fuel then flows axially upward within the spout 36. The periphery of the orifice plate 33 comprises an annular flange 33*a* secured within the upper cup portion of the housing 15 by a frictional fit.

Adjacent the upper end of the tubular orifice 35, the plate 33 flares conically upwardly to provide a valve seat 35*a* for an O-ring seal 37 of rubber-like material. The latter is carried by a valve plate 38 having a central downward projection 38*a* which defines an annular retaining groove 38*b* for the O-ring 37. The periphery of the valve plate 38 comprises an annular upturned flange 38*c* closely spaced from the adjacent portion of the flange 33*a* to provide a restricted or high resistance passage for fuel when the valve plate 38 is adjacent its closed position. At the latter position the O-ring seal 37 is seated at the conical valve seat 35*a*. Preferably at the closed position, the radial spacing between the flanges 38*c* and 33*a* is as small as feasible within reasonable mass production tolerances obtainable by sheet metal stampings and is on the order of about 0.002 inches. Spring 40 under compression between the base of the upper cup housing 15 and the valve plate 38 urges the latter to the closed position and holds the O-ring seal 37 at its seated position against the valve seat 35*a*.

When the engine 10 is not operating, the pump 13 also does not operate and the spring 40 acting against the plate 38 urges the latter downwardly to the closed position whereat the O-ring seal 37 seated at the conical valve seat 35*a* closes the valve port 35. When the engine 10 is started, it drives the fuel pump 13 which pumps fuel from the tank 12 via the fuel supply line 21, 18 to the inlet 17 and the underside of the plate 22, whereby the fuel is directed laterally to the openings 25*a* and thence axially upward around the outer circumference of the filter 23.

The pump 13 is operatively connected with the engine 10 as indicated by the dotted line 41 so as to be driven with increasing speed corresponding to increasing engine speed, and is designed to supply more fuel than is required by the engine 10. The excess fuel is discharged through the restriction 26 and returned via line 28 to the tank 12. Accordingly a continuous flow of comparatively cool fuel flows through the pump 13. Any vapor that tends to form in the fuel supply line and the pump 13 rises to the upper portion of the housing 15 in the annular space around the filter 23 and is discharged through restriction 26 along with the excess fuel.

By virtue of the pressure drop across the restriction 26 and ball check 29, the fuel required for operation of the engine is directed radially inwardly through the filter 23 to the interior of the latter and thence downwardly around the spout or pipe 36 and finally upwardly therethrough to the underside of the central portion 38*a* of the valve plate 38 overlying the port 35, thereby to exert a comparatively high fuel pressure against portion 38*a*, force plate 38 upwardly, and unseat the O-ring 37 from the valve seat 35*a* to effect a first stage open condition for port 35. The fuel pressure will then be directed against the entire surface area of the plate 38, so that a comparatively small fuel pump output pressure as compared to the initial pressure required to unseat the O-ring 37 will now hold the latter in the second stage open condition.

When the O-ring 37 is first unseated to effect a first stage open condition for the port 35, the small initial clearance between the flanges 38*c* and 33*a* provides the necessary resistance to fuel flow to assure positive unseating of the O-ring 37 against the force of spring 40 to a second stage open condition whereat the O-ring 37 is spaced downstream of the seat 35*a* sufficiently to open port 35 to the full extent desired to effect a low resistance passage for fuel flow. At a predetermined location downstream of the seat 35*a*, the flange 33*a* diverges radially outward to cooperate with flange 38*c* in the second stage open condition and increase the annular space therefrom such that the cross sectional area of the latter space is comparable in size to the effective cross sectional area of the fully open orifice 35. The fuel pressure acting on the plate 38 then counter-balances the closing force of spring 40 to hold plate 38 at the fully open second stage position.

The pressure required by pump 13 to maintain the valve plate 38 in its second stage or fully open position is materially reduced as aforesaid compared to the initial opening pressure. Thus the pump 13 may operate efficiently with minimum wearing of parts and lost power and with a minimal likelihood of vapor lock. The latter follows because at the reduced pumping pressure, both fuel and vapor may be discharged from the pump, whereas if the pump back-pressure were excessive and a vapor bubble formed within the pump 13, the bubble would merely expand and contract as the pump 13 operated and no fuel would be discharged therefrom.

In the event of an accident for example and the automobile is overturned, the engine 10 will inevitably stall and operation of the pump will stop. The spring 40 will then close port 35 by seating the O-ring 37 at the valve seat 35*a*. If in the overturned position of the automobile, the tank 12 is elevated above the housing 15, drainage of fuel from the tank 12 via conduit 21 is prevented by the seated O-ring 37. It is only essential that the spring 40 will be predetermined to provide sufficient closing force against the valve plate 38 to overcome any potential or likely fuel pressure head between the tank 12 and the valve portion 38*a*. In this regard, the filter 23 is located upstream of the check valve to prevent dirt in the fuel from interfering with closing of the valve plate 38. In particular it is necessary to prevent particulates from becoming lodged in the small clearance between the flanges 38*c* and 33*a*. Fuel leakage from the tank 12 via the vapor and fuel return line 28 is prevented by the conventional ball check valve 29.

Having described my invention, I claim:

1. In combination with an automotive vehicle having a fuel tank and an engine, fuel supply conduit means connected with said tank, a fuel pump driven by said engine and located in said conduit means for pumping fuel from said tank for use by said engine, means dependent upon operation of said pump to open said fuel conduit means comprising valve means operable at a closed condition to close said conduit means and operable at first and second stage open conditions respectively to provide a comparatively small first stage high resistance opening and a larger second stage low resistance opening for said conduit means, yieldable means normally urging said valve means to its closed condition, first pressure actuated means having a first area exposed to the fuel pressure in said conduit means between said tank and valve means and responsive to the latter pressure when said pump is operating for urging said valve means to its first stage open condition in opposition to said yieldable means, second pressure actuated means having a second area larger than said first area and exposed to the fuel pressure in said conduit means downstream of said first area and responsive to the latter pressure in cooperation with the pressure on said first area when said pump is operating for urging said valve means to its second stage open condition in opposition to said yieldable means, said yieldable means including means for yieldably urging said valve means to its closed condition with adequate force to oppose opening of said valve means in response to the maximum potential static fuel pressure in said conduit means against both said first and second areas resulting from vehicle roll-over when said pump is not operating.

2. In the combination according to claim 1, a fuel filter in said fuel supply conduit upstream of said valve means.

3. In the combination according to claim 1, said valve means comprising a housing defining a portion of said conduit means downstream of said pump, said housing having an inlet for receiving fuel from said pump and having an outlet, an orifice plate located in said housing between said inlet and outlet and having an annular valve seat defining an orifice comprising a portion of said conduit means, said orifice plate cooperating with said housing to restrict fuel flow through said outlet except via said orifice, and said valve means being movable downstream of said valve seat to and from a seated position thereat for closing said orifice.

4. In the combination according to claim 3, said second pressure actuated means and orifice plate cooperating to provide said second stage low resistance opening therebetween, and said yieldable means comprising resilient means under compression between said housing and valve means to urge the latter to said seated position.

5. In the combination according to claim 4, means for maintaining a comparatively low back pressure on said pump comprising a restricted vent duct communicating with said fuel supply conduit means at an upper portion of said housing upstream of said filter and downstream of said inlet for venting vapor and excess fuel from said housing, the pressure differential across the restriction of said vent duct comprising means for forcing fuel flow through said filter.

6. In the combination according to claim 1, said valve means comprising a housing defining a portion of said conduit means downstream of said pump and having an inlet for receiving fuel from said pump and having an outlet, fuel filter means arranged in said housing for filtering fuel flowing therein from said inlet to said outlet, an orifice plate located in said housing between said filter and outlet and having an annular valve seat defining a central orifice comprising part of said conduit means, said orifice plate and housing cooperating to restrict fuel flow through said outlet except via said orifice, said orifice plate having an annular downstream extending flange adjacent its periphery, said valve means comprising a valve plate spaced downstream of said orifice plate and having a central valve portion moveable with said valve means downstream of said valve seat to and from a seated position at said seat for closing said orifice, the peripheral portion of said valve plate being closely spaced from said flange when said valve means is at said first stage open condition, said flange having an annular offset for increasing the spacing from said peripheral portion to effect said second stage low resistance opening when said valve means is at said second stage open condition.

7. In the combination according to claim 6, means for maintaining a comparatively low back pressure on said pump comprising a restricted vent duct communicating with said fuel supply conduit means at an upper portion of said housing upstream of said filter and downstream of said inlet for venting vapor and excess fuel from said housing, the pressure differential across the restriction of said vent duct comprising means for forcing fuel flow through said filter.

* * * * *